United States Patent Office 3,526,765
Patented Sept. 1, 1970

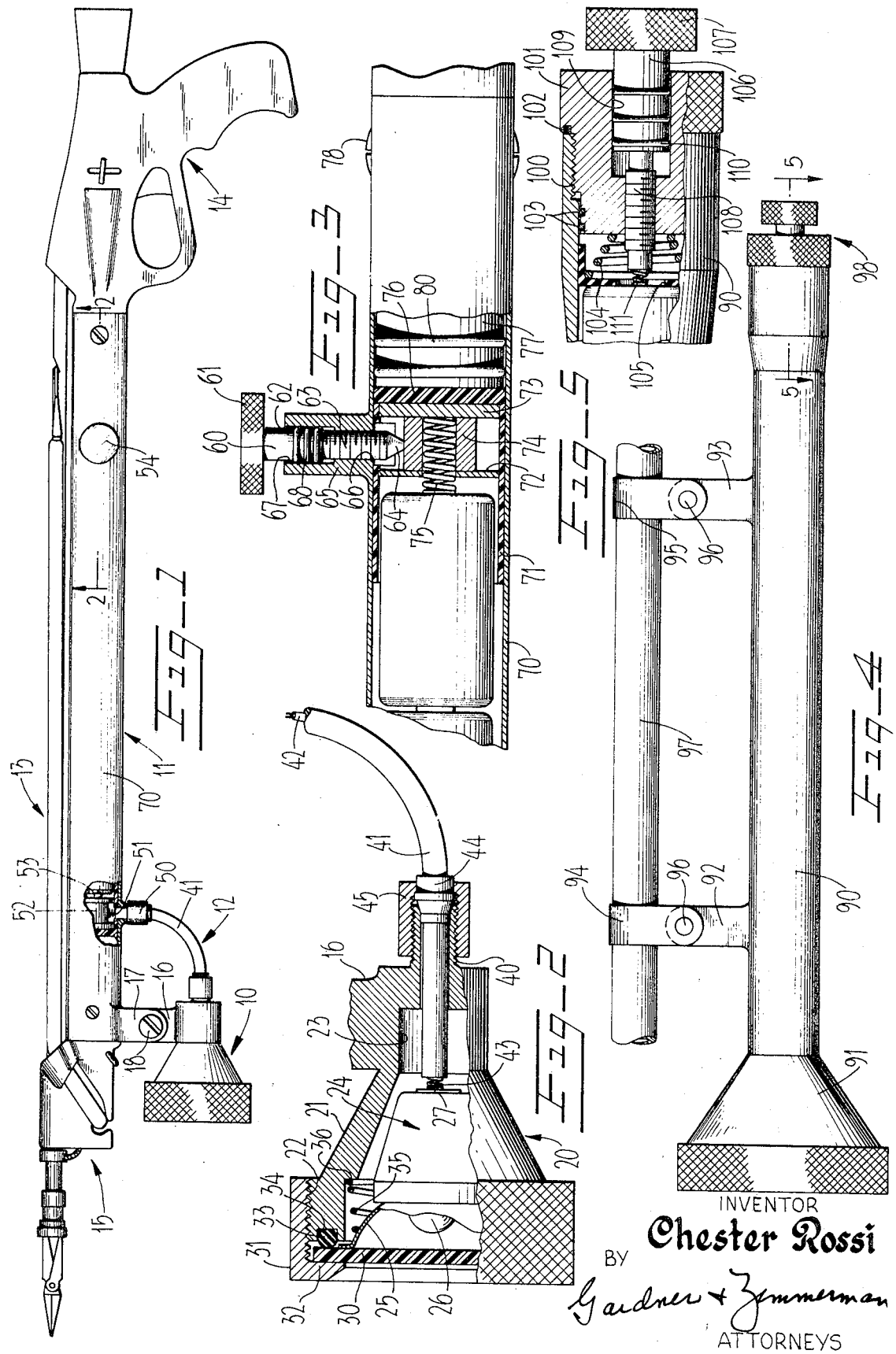

3,526,765
SEALED PORTABLE ELECTRIC LIGHT
Chester Rossi, 22322 Center St.,
Castro Valley, Calif. 94546
Filed Feb. 8, 1968, Ser. No. 704,139
Int. Cl. F21l 7/00; F41g 1/34
U.S. Cl. 240—10.6      4 Claims

ABSTRACT OF THE DISCLOSURE

A sealed portable electric light for use in a high pressure environment such as underwater. The light includes a sealed light unit that may be connected to remotely located batteries or attached directly to a battery case. A sealed switch mounted on the battery case is provided for turning on and off the light unit; and the switch includes an electrically conductive spool insulated from the battery case and having a central opening in which is mounted a spring resiliently engaging the negative terminal of a battery to connect the spool therewith. A conductive screw threadedly carried by the battery case is selectively engageable with the spool to connect the same electrically with the battery case so as to complete the electric circuit for the portable light.

BACKGROUND OF THE INVENTION

The present invention relates to sealed portable electric lights and more particularly to sealed electric lights that are adapted for use under high pressure conditions as, for example, underwater diving operations. Portable lighting apparatus used underwater must be sealed to prevent entry of the water that would short out the electrical circuits and corrode the metal parts of the light. This is particularly true in the case of portable lights to be used in salt water or other conducting fluids.

In addition, lights used by undewater divers, such as those who use self-contained breathing apparatus, must be compact and light in weight. Such divers must use their hands to move about and to operate equipment. For example, to use spear guns to hunt fish and other creatures requires both hands, and the diver cannot operate and aim a bulky underwater light along with the spear gun. Presently availabe underwater lights are bulky lantern type lights and are limited in their use. They require both hands to operate and aim and do not leave the diver's hands free.

In addition to the bulkiness of available underwater lights they also include switch mechanisms that are difficult to operate. Thus, the usefulness of the light is seriously restricted since it is impossible to switch the light on and off at frequent intervals.

SUMMARY OF THE INVENTION

The present invention solves the above problems by providing a compact sealed light having a switch means that can be easily operated. The light consists of a light unit and a battery case with the light being electrically coupled to the battery case. The battery case may be either formed integrally with the light unit or may form a portion of the framework of the equipment, for example, the frame of the spear gun.

The light is provided with a simplified switch mechanism that consists of a body having a tubular bore and an actuating member that threads into the bore. The actuating member is provided with a series of O-rings that cooperate with the bore to form a watertight seal. The actuating member is moved inwardly to complete the electrical circuit to turn on the light and outwardly to interrupt the electrical circuit to turn off the light. Thus, the switch means is operated by simply turning the actuating member to move it inwardly or outwardly.

BRIEF DESCRIPTION OF THE DRAWINGS

The construction of the sealed portable light of this invention will be more easily understood from the following detailed description of the preferred embodiment when taken in conjunction with the attached drawings in which:

FIG. 1 is a side view of a spear gun incorporating a light constructed according to this invention;

FIG. 2 is an enlarged view of the light unit with a portion thereof shown in section;

FIG. 3 is an enlarged sectional view of the switch means shown in FIG. 1;

FIG. 4 is a side view of a modified embodiment of the invention in which the light is constructed as a separate unit that may be attached to the spear gun; and FIG. 5 is a sectional view of the modified switch means used with the light unit shown in FIG. 4.

DESCRIPTION OF THE PREFERRED EMBODIMENTS

Referring now to FIG. 1 there is shown in light unit 10 that is coupled to a battery case 11 by means of a sealed electrical connection 12. The battery case 11 forms a portion of the frame work of a spear gun 13 wherein the handle and trigger mechanism 14 is attached to one end of the battery case and the front end of the spear gun 15 is attached to the opposite end. The spear gun is of conventional construction with the battery case 11 being substituted for the normal tubular frame of the spear gun.

The light unit is secured to the battery case by means of a lug 16 that is formed integrally with the light unit. The lug extends upwardly into a fork member 17 that is formed integrally with the forward end of the battery case. A bolt 18 is used for coupling the lug 16 to the fork member 17 and in addition creates sufficient friction between the mating surfaces of the lug and the fork members to retain the light unit in position.

The detailed construction of the light unit is shown in FIG. 2 and consists of a housing 20 that has a tubular conically shaped central section 21 terminating in a threaded portion 22 at its large end. The apex of the conical section terminates in a tubular section 23. The housing should be formed of an electrically conducting corrosion resistant material, for example, cast aluminum. While materials such as brass or bronze may also be used they are considerably heavier than aluminum and thus not as desirable in lights used in diving operations. The light assembly 24 is disposed in the enlarged end of the housing and consists of a reflector 25 and a light bulb 26 which screws into the socket of the light assembly. The socket of the light assembly is provided with one terminal 27 of the circuit, the second terminal of the circuit being the outer case and reflector of the light assembly. The light assembly may be of various constructions, for example, the reflector and socket assembly similar to those used in flashlights may be used. The light assembly is retained in the housing by a clear lens 30 that is placed over the open end of the light assembly. The lens is retained in place by means of a threaded end cap 31 having an inwardly extending radial flange portion 32 that engages the peripheral edge of the lens. A sealing ring, for example, an O-ring 33, is disposed in an annular groove 34 formed in the end of the threaded portion 22 of the housing. The sealing ring provides a watertight seal between the end surface of the housing and the surface of the lens.

A good electrical connection between the light assembly and the housing of the light unit is ensured by compression spring 35. One end of the compression spring is in electrical contact with the outer surface of the reflector 25 while the other end of the spring engages an inwardly projecting shoulder 36 formed on the end of the conical portion of the housing. While the outer edge of the reflector 25 may possibly engage the end of the threaded portion of the housing providing the sealing ring is compressed, the use of the spring 35 ensures completion of the electrical circuit even if the reflector should fail to contact the housing.

The tubular portion 23 of the housing is provided with axially extending threaded portion 40 having a flexible tube or conduit 41 passing through a central bore formed therein. An insulated electrical conductor or wire 42 is disposed within the flexible tube and terminates at its end in a contact or terminal 43. A compression spring may be secured between the end of the conductor and the terminal 43 to ensure engagement or electrical contact between the terminal 27 of the light assembly and the terminal 43. The outer surface of the flexible tube 41 is sealed to the housing of the light unit by means of a swage or compression fitting 44 that is locked in position by means of a lock nut 45 that threads over the threaded portion 40 of the housing. The swage or compression fitting may be a standard type of compression fitting used with flexible tubing. The flexible tubing may be plastic tubing or metal tubing.

The opposite end of the flexible tube 41 is sealed to the battery case by means of a similar compression fitting including a lock nut 50. The opposite end of the electrical conductor 42 is secured to a compression spring that makes electrical contact with a central conductor 52 in the battery case. Conductor 52 may be a cylindrical member formed of an electrical conducting material, as for example, aluminum, that is mounted in the battery case and insulated therefrom. One end of the conductor 52 makes electrical contact with one terminal 53, for example, the center terminal, of the end battery in the battery case. It is to be understood of course that the battery case may contain several conventional flashlight batteries, the number depending upon the amount of light desired as well as the expected battery life. The batteries are disposed in the battery case in the conventional manner in which all of the positive or center terminals, for example, are aligned in one direction with the leftmost positive pole 53 contacting the electrical conductor 52. A switch means 54 is provided on the battery case for completing the circuit between the battery case and the negative terminal of the battery at the right-hand end of the battery case. The tubular battery case 70 is preferably formed of an electrical conducting corrosion resistant metal such as aluminum.

The detailed construction of the switch means is shown in FIG. 3 and consists of an actuating member disposed in a body member that projects outwardly from the battery case. The actuating member consists of a smooth cylindrical center portion 60 that terminates in a knurled end 61 at its outer end. The opposite end of the smooth cylindrical portion terminates in a threaded portion 63 whose extreme end terminates in conical point 64. The body member is provided with a central bore having a smooth bore 67 and a threaded portion 66. It should be noted that threaded portion 66 has a smaller diameter than the smooth portion of the central bore. A series of sealing rings 68 for example, O-rings, are mounted in radial grooves formed in the actuating member and cooperate with the smooth portion of the central bore 67 to form an effective watertight seal.

The battery case 70 is provided with insulated tubular sleeve 71 at its right hand end mounted within the insulated tubular sleeve is a spool assembly formed from two spaced metal disks 72 and 73 having central spool member 74 secured to both of the disks. A compression spring 75 is disposed in the central opening of the spool member and serves to force the batteries to the left into contact with the conductor 52 as described above. The spool assembly is held in position by means of an end plug 77 whose left-hand end engages an insulating washer 76 that is disposed between the disk 73 and end plug 77. The end plug 77 may be an extension of the handle of the spear gun and is held in position by a pair of diametrically opposite machine screws 78 that pass through the battery case and thread into the plug member. A plurality of sealing or O-rings 80 are disposed in radial grooves formed in the plug member and cooperate with the inner surface of the battery case to form an effective watertight seal. A similar end plug (not shown) is fitted in the opposite end of the battery case.

From the above description it can be appreciated that when the batteries are positioned in the battery case and the plug members positioned in the ends of the battery case, the batteries will be forced to the left into electrical contact with each other and the conductor at the opposite end of the battery case. The metal spool member 74 and the disks will be insulated from the battery case by the insulating sleeve 71. Thus, to complete the electrical circuit it is necessary to turn the actuating member 60 so as to move it axially downward as shown in FIG. 3 until the conical end 64 engages the outer surface of the spool member 74. When contact is made the electrical circuit will be completed between the negative terminal or the outer case of the batteries and the battery case. In order to break the electrical circuit and turn off the light the actuating member is turned in the opposite direction so that the member is moved upwardly and the conical end moved out of contact with the spool member 74. This provides a simple switch of rugged construction that is easy to operate while remaining completely sealed. The switch is easy to operate since it merely requires turning of the actuating member 60 while the watertight seal is provided by the plurality of O-rings positioned along the actuating member.

Referring now to FIGS. 4 and 5, there is shown a modified form of the invention in which the light comprises a complete unit that may be attached to a spear gun or the like as desired. The light consists of a battery case 90 to which a light unit 91 is attached at one end or the light unit and battery case may be formed as an integral part if desired. The battery case is provided with two upwardly extending lug members 92 and 93. The lug members are positioned between mounting brackets 94 and 95 disposed on the spear gun and having downwardly extending forked ends. A pair of bolts 96 are used for securing the lugs to the mounting brackets.

The modified light is provided with a modified switch means 98 which is shown in detail in FIG. 5. The modified switch means comprises an end plug 101 that threads into a threaded end 100 on the battery case 90. An O-ring 102 is disposed in an annular groove formed in the outwardly extending flange of the end plug 101 effectively sealing the mating surfaces of the battery case and the end plug. To ensure a watertight seal an additional pair of O-rings 103 may be disposed in radial grooves formed in the inner end of the end plug 101. The O-rings 103 cooperate with the inner surface of the battery case to form an effective watertight seal. The actuating member of the modified switch is similar to the actuating member described above with reference to FIG. 3. More particularly, the actuating member is provided with a smooth cylindrical central portion 106 that terminates in a knurled knob 107 at its outer end. The smooth central portion is provided with a threaded portion 108 at its opposite end. A plurality of O-rings 110 or similar sealing rings are disposed in radial grooves formed in the outer surface of the smooth portion 106 of the actuating member and cooperate with the inner surface of the central bore 109 formed in the end plug to form an effective watertight seal. A small compression spring 111 is secured to the inner end of the actuating member with the compression spring 111 making contact with the end of the battery to complete the electrical circuit. The batteries are forced into electrical contact with each other and the terminal end on the light unit by means of a compression spring 104 disposed between the inner end of a plug and a cup-shaped insulating member 105 that engages the end of the batteries. Thus, when the end plug is threaded into the end of the battery case the spring will be compressed and force the batteries to the left as shown in FIG. 4. This will force the batteries into contact with each other and with the terminal on the end of the light unit. It is, of course, understood that the light unit used with the modified light is of the same construction as that shown in FIG. 2. More particularly, the socket assembly is provided with a central terminal that engages the positive or center terminal of the battery.

The use of the small compression spring 111 at the end of the actuating member ensures good electrical contact with the end of the battery without the risk of physically damaging the battery. It is of course possible if a solid end was used on the actuating member to engage the end of the battery with sufficient force to physically damage the battery as, for example, by rupturing the outer case of the battery. Thus, it may be preferable in certain instances to utilize the compression spring instead of a solid end on the actuating member as shown in FIG. 3.

From the above description, it is appreciated that a simplified switch means has been provided in which an actuating member is moved axially to complete an electrical circuit between the battery case and one terminal of the battery. The use of an actuating member that is moved axially permits the use of sealing rings, as for example, O-rings, to form a watertight seal between the actuating member and the housing of the battery case. Further, the axial movement of the actuating member is obtained by providing a threaded portion on the actuating member that engages a similar threaded portion of the member secured to the battery case. Thus, the switch is actuated by simply turning the actuating member to cause it to move axially and complete the first electrical circuit. The axial movement of the switch does not damage the sealing rings and the switch remains watertight.

The invention also provides a light unit that is completely sealed to render it watertight and useful at substantial depths, for example, 100 to 200 feet or more at the same time the light is watertight it may be easily disassembled to replace the batteries without damaging the sealing rings. This enables the light to be serviced in remote areas without requiring spare seals or other items. This is important when lights are used by sport divers since their diving is normally done in remote areas.

When the light is constructed of light weight materials, as for example, aluminum and integrally with the spear gun, it will add little weight to the spear gun. This is important since the gun must be carried to the surface along with the fish that is speared. In addition to providing a lightweight unit, the combination also provides a light that is aimed in the same direction as the gun. Thus, the light illuminates the area being hunted by the diver.

What is claimed is:

1. A sealed portable electric light operable under water at relatively great depths, comprising an axially-extending electrically-conductive battery case defining a water tight compartment for the receipt therein of batteries each having positive and negative terminals, a light unit secured to said battery case adjacent one end thereof and being electrically connected therewith so that one terminal of a light bulb mounted within said light unit is electrically connected to said battery case, means for connecting the other terminal of such light bulb to the positive terminal of such battery, and switch means carried by said battery case for selectively connecting the negative terminal of such battery to said battery case to energize a light bulb mounted within said light unit, said switch means including an insulating sleeve mounted within said battery case adjacent the other end thereof, an insulating washer defining an abutment adjacent one end of said sleeve, a conductive spool coaxially mounted within said sleeve in abutment at one end with said washer and being electrically connectable with the negative terminal of such battery, and a conductive actuating member threadedly secured to said battery case for radial movement with respect thereto between an outer position remote from said spool and an inner position in engagement therewith to connect the same and any battery connected therewith to said battery case.

2. The electric light of claim 1 in which said conductive spool has an axially extending opening therein, and further including a compression spring mounted within said opening and being engageable with the negative terminal of such battery to electrically connect said conductive spool therewith and to resiliently bias such battery toward the first-mentioned end of said battery case.

3. The electric light of claim 1 in which said light unit includes a housing having a generally conical center section terminating in a tubular end at the apex thereof, a lens covering the open end of said conical section and being sealing related thereto, and in which the aforesaid means for connecting the other terminal of such light bulb to the positive terminal of such battery comprises a flexible electric conductor sealed to said tubular end and being electrically connectible to the aforesaid other terminal of such light bulb and also being electrically connectible to the aforesaid positive terminal of such battery, said flexible conductor also being sealed to said battery case to prevent ingress of water thereinto.

4. The electric light of claim 3 in which said conductive spool has an axially extending opening therein, and further including a compression spring mounted within said opening and being engageable with the negative terminal of such battery to electrically connect said conductive spool therewith and to resiliently bias such battery toward the first mentioned end of said battery case.

References Cited

UNITED STATES PATENTS

| | | | |
|---|---|---|---|
| 1,919,024 | 7/1933 | Abbotts | 240—10.68 |
| 1,955,511 | 4/1934 | Muros | 240—10.66 |
| 2,016,819 | 10/1935 | Meginniss | 240—10.66 |
| 2,599,295 | 6/1952 | Thomas | 240—10.66 XR |
| 2,912,566 | 11/1959 | Cornett | 240—6.41 |
| 3,222,511 | 12/1965 | Breeding | 240—6.41 |
| 3,329,810 | 7/1967 | Meagher | 240—26 XR |
| 3,398,271 | 8/1968 | Sakamoto | 240—10.63 |

NORTON ANSHER, Primary Examiner

U.S. Cl. X.R.

240—6.41, 26